United States Patent
Kleinschmidt et al.

(10) Patent No.: US 9,244,900 B2
(45) Date of Patent: Jan. 26, 2016

(54) TEMPLATE BASED WEBSITE DEVELOPMENT AND MANAGEMENT

(75) Inventors: Uwe Kleinschmidt, Santa Barbara, CA (US); Svatjoslav Rilov, Lynnwood, WA (US); Ute Gerlach, Stuttgart (DE)

(73) Assignee: AutoVitals, Inc., Santa Barbara, CA (US)

( * ) Notice: Subject to any disclaimer, the term of this patent is extended or adjusted under 35 U.S.C. 154(b) by 337 days.

(21) Appl. No.: 13/570,037

(22) Filed: Aug. 8, 2012

(65) Prior Publication Data

US 2014/0046980 A1 Feb. 13, 2014

(51) Int. Cl.
- G06F 7/00 (2006.01)
- G06F 17/30 (2006.01)
- G06F 17/24 (2006.01)
- G06F 17/21 (2006.01)
- G06F 17/22 (2006.01)

(52) U.S. Cl.
CPC ............ *G06F 17/248* (2013.01); *G06F 17/218* (2013.01); *G06F 17/2247* (2013.01); *G06F 17/30896* (2013.01)

(58) Field of Classification Search
CPC ..... G06F 17/30; G06F 17/30607; G06F 7/00; G06Q 10/06; G06Q 30/02
USPC ........................................................ 707/793
See application file for complete search history.

(56) References Cited

U.S. PATENT DOCUMENTS

| | | | |
|---|---|---|---|
| 6,611,740 B2 | 8/2003 | Lowrey et al. | |
| 6,611,842 B1* | 8/2003 | Brown | |
| 6,625,595 B1* | 9/2003 | Anderson et al. | |
| 6,636,853 B1* | 10/2003 | Stephens, Jr. | |
| 6,735,503 B2 | 5/2004 | Ames | |
| 6,933,842 B2 | 8/2005 | Oesterling et al. | |
| 7,092,937 B2 | 8/2006 | Morgan et al. | |
| 7,120,632 B2* | 10/2006 | Helmbrecht et al. | |
| 7,287,229 B2* | 10/2007 | Forkner et al. | 715/762 |
| 7,313,604 B2* | 12/2007 | Wood et al. | 709/219 |
| 7,594,168 B2* | 9/2009 | Rempell | 715/234 |
| 7,729,824 B2 | 6/2010 | Tolkacz | |
| 7,739,590 B2* | 6/2010 | Stocker et al. | 715/235 |
| 7,747,941 B2* | 6/2010 | Campbell et al. | 715/234 |
| 7,779,352 B1* | 8/2010 | Underwood et al. | 715/250 |
| 7,860,820 B1* | 12/2010 | Rajkumar et al. | 709/203 |
| 7,900,190 B2* | 3/2011 | Brunswig et al. | 717/107 |
| 7,920,944 B2 | 4/2011 | Gould et al. | |

(Continued)

*Primary Examiner* — Hosain Alam
*Assistant Examiner* — Nicholas Allen
(74) *Attorney, Agent, or Firm* — SoCal IP Law Group LLP; Jonathan Pearce; Steven C. Sereboff (57) ABSTRACT

There is disclosed a method and apparatus for template based website development and management. The method includes obtaining input of an entity identifier designating an entity database record within a database and obtaining entity data including data pertaining to the entity of the website from the entity database record within the database using the entity identifier. The method further includes accessing a template including a content container and a style element and substituting the entity data for the content container. The method further includes enabling revision of the web page by customizing style elements to thereby create customized style elements, receiving a request to update the web page to include updated entity data from the database, and regenerating the web page using the template by substituting the updated entity data for the content containers, the updated entity data presented as directed by the customized style elements.

19 Claims, 7 Drawing Sheets

(56) References Cited

U.S. PATENT DOCUMENTS

| | | | |
|---|---|---|---|
| 8,176,408 B2* | 5/2012 | Ammerlaan et al. | 715/200 |
| 8,335,799 B2* | 12/2012 | Tymoshenko et al. | 707/791 |
| 8,433,724 B2* | 4/2013 | Rajkumar et al. | 707/769 |
| 8,515,941 B1* | 8/2013 | Avritch et al. | 707/711 |
| 8,533,661 B2* | 9/2013 | Nucci et al. | 717/105 |
| 8,595,300 B2* | 11/2013 | Underwood et al. | 709/205 |
| 8,615,712 B2* | 12/2013 | Porter et al. | 715/744 |
| 8,683,324 B2* | 3/2014 | Chang | 715/235 |
| 2002/0016655 A1 | 2/2002 | Joao | |
| 2002/0152224 A1* | 10/2002 | Roth et al. | 707/104.1 |
| 2003/0014442 A1* | 1/2003 | Shiigi et al. | 707/513 |
| 2004/0148188 A1 | 7/2004 | Uegak | |
| 2004/0230983 A1* | 11/2004 | Shi et al. | 719/310 |
| 2005/0273705 A1* | 12/2005 | McCain | 715/513 |
| 2007/0136201 A1* | 6/2007 | Sah et al. | 705/51 |
| 2007/0274519 A1* | 11/2007 | Cohen et al. | 380/201 |
| 2008/0065974 A1* | 3/2008 | Campbell | 715/200 |
| 2008/0172600 A1* | 7/2008 | Bokor | 715/234 |
| 2008/0189320 A1* | 8/2008 | Lee | 707/102 |
| 2008/0201118 A1* | 8/2008 | Luo | G06F 17/3089 703/2 |
| 2009/0113317 A1 | 4/2009 | Summers et al. | |
| 2009/0222416 A1* | 9/2009 | Tymoshenko et al. | 707/3 |
| 2010/0095197 A1* | 4/2010 | Klevenz et al. | 715/234 |
| 2010/0125852 A1 | 5/2010 | Grant et al. | |
| 2010/0211885 A1* | 8/2010 | Berg et al. | 715/745 |
| 2010/0235411 A1 | 9/2010 | Bray | |
| 2010/0235806 A1* | 9/2010 | Mohan | 717/100 |
| 2010/0274606 A1* | 10/2010 | Fain et al. | 705/7 |
| 2011/0209045 A1* | 8/2011 | Ghosh et al. | 715/234 |
| 2011/0264651 A1* | 10/2011 | Selvaraj | G06F 17/30867 707/723 |
| 2012/0047425 A1* | 2/2012 | Ahmed | 715/234 |
| 2013/0117657 A1* | 5/2013 | Verlaan et al. | 715/234 |
| 2013/0167009 A1* | 6/2013 | Tymoshenko et al. | 715/234 |

* cited by examiner

TEMPLATE BASED WEBSITE DEVELOPMENT AND MANAGEMENT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to template based website development and management.

2. Description of the Related Art

Website development takes a number of forms. Traditional website development involves the actual creation of web pages "from scratch," for example, using hypertext markup language (HTML), Javascript, Adobe® Flash® directly or through the use of web development tools. Total customization is available when creating "from scratch" web pages, but substantial web development skill may be necessary to create professional-looking web pages.

Software-based and online template-based tools are provided by third party software developers, web hosts and other sources. These template-based tools typically provide a user with the capability for a user to create a "fill-in-the-blanks" style website using a template. Typical templates provide uniform style elements for websites. These style elements may include background colors or images, font selection and sizes, header style, and various other style elements for a template-based web site. The use of templates enables a user to create professional-looking web pages with little or no knowledge of web languages or third party software. However, customization of these templates may be difficult or result in altering the style of an entire web page. Reversion to or reapplication of the template may result in loss of any customization. It can also be difficult for a non-web developer to customize the template so as to incorporate custom graphical elements or other stylistic changes.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
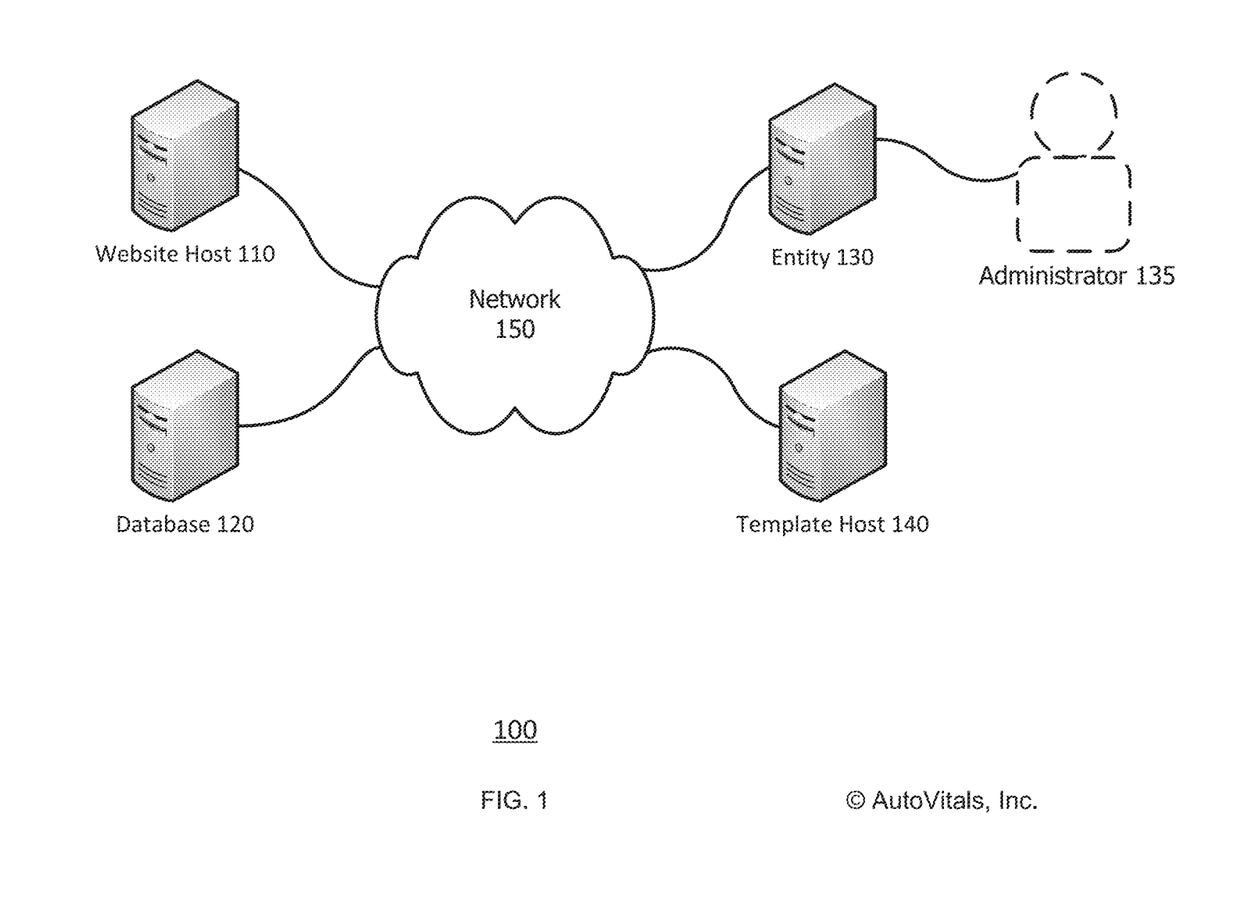
FIG. 1 is a block diagram of an environment for template based website development and management.

Referring now to FIG. 1, there is shown an environment 100 for template based website development and management. The environment 100 includes a website host 110, a database 120, an entity system 130, and a template host 140. The environment 100 may be implemented using distributed computing and interconnected by the network 150. Each of the website host 110, database system 120, entity system 130 and template host 140 are computing devices described below with reference to FIG. 2. An administrator 135 may utilize the entity system 130 to interact with the environment 100.

The website host 110 is a computer or group of computers, the group of computers may or may not be distributed, running web server software and storing data that is used to host the website of an entity. As used herein the phrase "website operating entity" or "entity" means the entity for whom the website is created and/or maintained. For example, a company is typically the "entity" that operates its own website. The website may be hosted by a separate hosting company and website development may be undertaken on behalf of an entity by the hosting company or a website development company. Neither of these are the "entities" operating the site. An individual, partnership, non-profit entity, governmental entity or other entity type for whom a website is created and/or maintained is the "website operating entity" or "entity."

The website host 110 is a computing device running software for serving web pages and suitable for storing web pages that are created in whole or in part for the website operating entity. The website host 110 may also provide database services, audio or video streaming or hosting services or provide the capability to run applications used on or by portions of the website. Hosting services may also include advertising services, such as the selection of advertisements for display on the website. These advertising services may or may not be provided by the same website host 110.

The database system 120 (or "entity database") is one or more computing devices running database software. The database system 120 collects and stores data pertaining to one or more website operating entity. The database system 120 may be operated by the same entity that operates the website host 110. Alternatively, the database system 120 may be operated by a third-party that collects and aggregates data pertaining to businesses. This service may be voluntary opt-in or may include data aggregated from publicly-available sources, such as via crawling of websites, searching databases or via other sources. The database system 120 may be accessible via an application programming interface by which a programmer can gain access to aspects of the data stored in the database system 120.

The entity system 130 is a computing device running operating system and application software suitable to access and interact with the network 150. An administrator 135 may interact with the website host 110, the database system 120 and the template host 140 in order to create and maintain a website for the website entity. The administrator 135 is shown as an individual, but it may in fact be one or more individuals or an entire department of a website entity and/or an administrator of the website host 110.

The template host 140 is a computer device running software suitable for hosting a plurality of website templates. The template host 140 may also run web server software and a web-based (or mobile-accessible, database-based) software suitable for access to a plurality of templates that may be utilized by, for example, a website operating entity to generate template-based websites. The template host 140 is shown as separate from the website host 110 and database system 120, but may be implemented in the same computing device or group of distributed computing devices.

Figure 2:
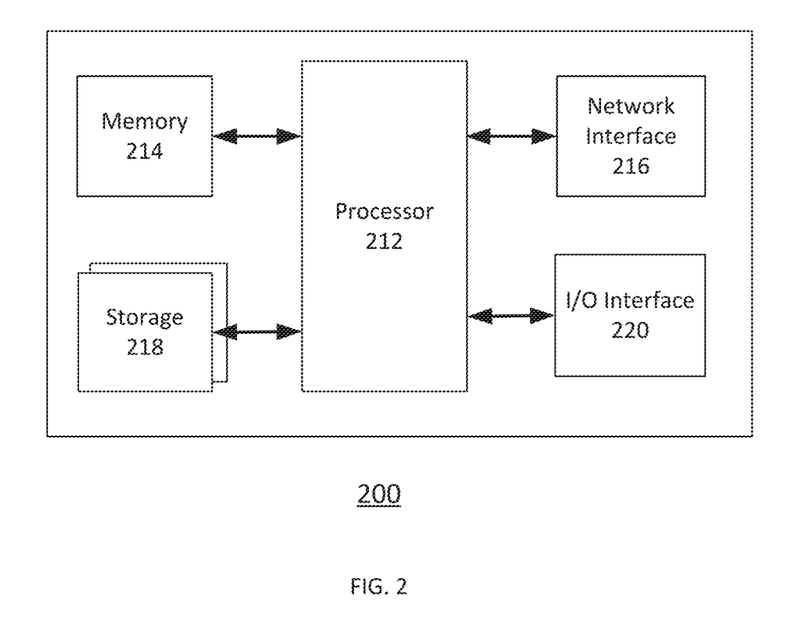
FIG. 2 is a block diagram of a computing device.

Turning now to FIG. 2 there is shown a block diagram of a computing device 200, which is representative of the server systems, client systems, mobile devices and other computing devices discussed herein. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein.

The computing device 200 has a processor 212 coupled to a memory 214, storage 218, a network interface 216 and an I/O interface 220. The processor 212 may be or include one or more microprocessors, field programmable gate arrays (FPGAs), application specific integrated circuits (ASICs), programmable logic devices (PLDs) and programmable logic arrays (PLAs).

The memory 214 may be or include RAM, ROM, DRAM, SRAM and MRAM, and may include firmware, such as static data or fixed instructions, BIOS, system functions, configuration data, and other routines used during the operation of the computing device 200 and processor 212. The memory 214 also provides a storage area for data and instructions associated with applications and data handled by the processor 212.

The storage 218 provides non-volatile, bulk or long term storage of data or instructions in the computing device 200. The storage 218 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the term storage medium corresponds to the storage 218 and does not include transitory media such as signals or waveforms. In some cases, such as those involving solid state memory devices, the memory 214 and storage 218 may be a single device.

The network interface 216 includes an interface to a network such as network 150 (FIG. 1).

The I/O interface 220 interfaces the processor 212 to peripherals (not shown) such as displays, keyboards and USB devices.

Figure 3:
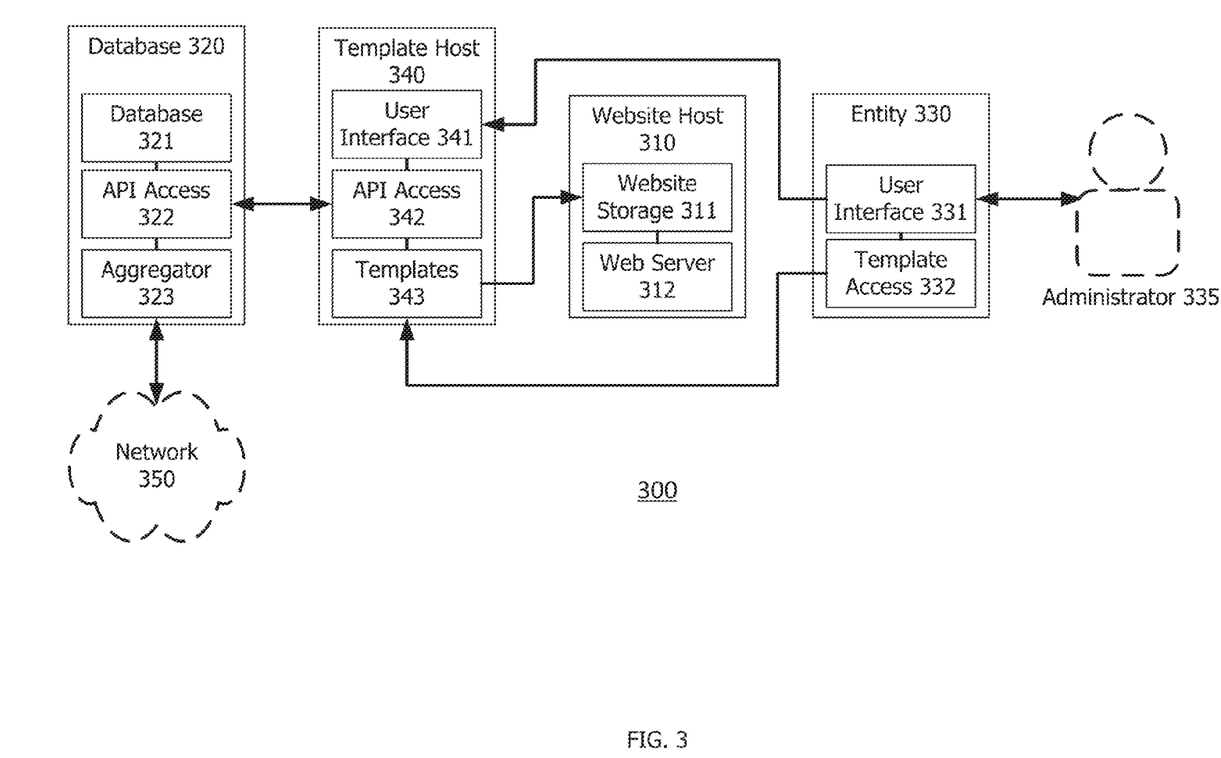
FIG. 3 is a block diagram of a system for template based website development and management.

Turning now to FIG. 3, a block diagram of a system 300 for template based website development and management is shown. The website host 310, database system 320, entity system 330 and template host 340 correspond to the website host 110, database system 120, entity system 130 and template host 140 in FIG. 1. The network 350 may be the network 150 of FIG. 1.

The website host 310 includes website storage 311 and web server software 312. The database system 320 includes a database 322, API access system 322, and a data aggregator 323. The database server system 320 may access the network 350, such as the internet. The entity system 330 includes a user interface 331 and template access 332. The template host 340 includes a user interface 341, API access 342 and a plurality of templates 343.

The website host 310 stores the web page or pages in that are created during the template-application process in website storage 311. The website host 310 may store a plurality of web pages in the website storage 311. At least one of the web pages stored in website storage 311 is a website for the entity. The web server 312 of the website host 310 serves the websites stored in the website storage 311 to requestors of those websites. The web server 312 may also provide streaming or database management for use by the entity's website.

The database system 320 (or "entity database") includes a database 321 that stores data pertaining to a plurality of website operating entities. This data may be obtained through the use of the data aggregator 323. The data aggregator 323 may be, for example, a web crawler or spider that obtains data pertaining to particular website operating entities automatically. That data may be associated in the database 321 by the data aggregator 323 with the website operating entity. The database system 320 may be, for example, a business directory operated by a web search company. For example, Google® operates an aspect of its search facility as Google® Places. Other online databases such as the Yellow Pages® or Martindale Hubble® may also be used as the database system 320. The database server system 320 may aggregate data for use in search. The database system 320 may, alternatively, be an entity directory, similar to the Yellow Pages® or a consumer advice website that compiles ratings or reviews of particular entities (business or otherwise) and may also provide location and contact information.

The database system 320 may provide access to that data via an API (application programming interface) access system 322. The API access system 322 may enable a third party to obtain data compiled by the data aggregator 323 and contained in the database 321 from the database system 320. The data aggregator 323 may interact, for example by crawling, with the network 350 to obtain data. This data may be provided in the form of a complete or partial database, a database query response, in extensible markup language (XML), comma separated values or other data forms. Access to the API access system 322 may require the party accessing the database 321 to obtain and use a username and password or API access key and internet protocol address combination when making API requests. Access to the API access system 322 may be provided free of charge, for a flat, periodic fee or on a pay-per-use basis.

The entity system 330 includes a user interface 331 for use by the administrator 335. The user interface 331 may include application software that is used to access the template host 340. This application software may be a stand-alone application that is used to access and utilize templates 343. This access may or may not be through a user interface 341 of the template host 340. For example, the user interface 331 may be or include a web browser or web-enabled software application. That web browser or web-enabled software application may access a remote user interface 341 on the template host 340. Alternatively, template access system 332 may be implemented, for example, as a stand alone software application that interfaces with the templates 343 stored on the template host 340.

The template host 340 includes the user interface 341 which may be, as described above, a web application or similar interface for enabling a user to access the templates 343 stored on the template host. The user interface 341 may also enable the administrator 335 to upload any resulting web page created using the template host 340 to the website host 310. The template host 340 also includes API access 342 that is used to obtain data stored in the database 321 on the database system 320. The data obtained from the database 321 may be integrated with a template selected from the templates 343 to thereby create a web page which is stored in website storage 311 and served by the web server 312.

Description of Processes

Figure 4:
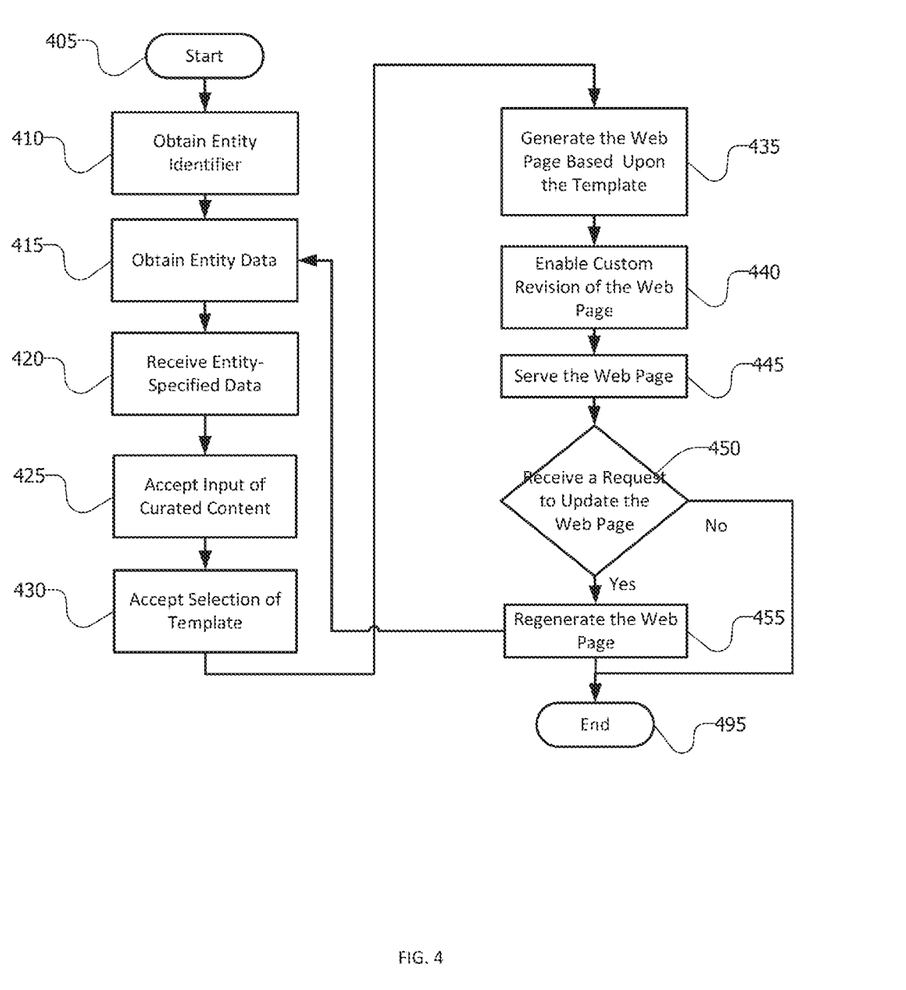
FIG. 4 is a flowchart for template based website development and management.

Referring now to FIG. 4, a flowchart for template based website development and management is shown. First, an entity identifier is obtained at 410. The "entity identifier" as used herein is a unique identification associated with a website operating entity. The entity identifier is generated by a party unrelated to the operator, the website host or the template provider (the "database provider"). The entity identifier is associated with entity data also maintained by the database provider. For example, this entity identifier may be a database identification number for a website operating entity. One example of such an entity identifier is Google® Inc.'s "CID" which uniquely identifies any entity with a physical address within all Google® services. This CID and any associated entity data is gathered and maintained by Google® Inc. Other examples include database record identifiers or entity names.

This entity identifier may be obtained, for example, by accessing the database system 320. This access may take place directly, for example, through the API access 322 or by a direct query to the database 321. Alternatively, the entity identifier may be obtained by a search (web or database) for a database entry pertaining to a particular operator.

Once the entity identifier is obtained, it may be used to obtain entity data 420. Entity data may include a physical address, telephone number and a link to any related website. The entity data may also include a facsimile number, email addresses, a map of the business location, links to profile pages on promotional or social networking websites, links or direct access to reviews, comments or other user-input data pertaining to the operator, menus, prices, specialties of the operator, operating hours and other similar data. This entity data is maintained by a database administrator. The entity data may be updated, typically by the database administrator for the database 321, periodically, dynamically or on request by the operator.

Once the entity data is obtained, the operator may input entity-specified data 430. The entity-specified data may include, for example, images of the operator's physical location, images of the operator or its employees, logos for the operator, headers for use in a web page created by the system, specialties, affiliations, business data such as the founding year of the business and other entity-specified data. In some cases, this entity-specified data may replace or augment data obtained automatically using the entity identifier. In some cases, third parties may be empowered to add to some or all of this entity-specified data—for example, uploading photographs of the operator location for inclusion in the entity data.

Once entity data and entity-specified data are obtained, curated content may be added. This curated content may include content regarding existing customers such as the total number of associated customers, makes, models, and types of customers of the operator. Loyalty programs with which a viewer of the website is associated with and any other user-specific content may also be included. This curated content may be provided in place of a content container into which data pulled from a database using a database call is added as the web page is served. In addition, reviews from third-party websites, operator ratings and feedback, potentially from the website operating entity or from third party sites may also be included.

The curated content may also include curator authored content regarding the operator. This content may be authored by the operator, but may also be authored by a copy writer. This curated content may include "about us" paragraphs for the operator, descriptions of specialties and similar content. This curated content may also be generated as the web page is delivered, with portions of the content taking the form of place holders for content that will be inserted into the authored content. For example, "[This automotive repair shop] specializes in repair of [automobile makes] automobiles," may be replaced in real time, with reference to a database, as a web page is served with "Bob's Automotive Repair specializes in repair of Toyota® and Lexis® automobiles.

In addition, the curated content may include real-time streams of data to be included in the web page as it is served to a requestor. For example, real-time streams may be or include a series of Yelp® reviews, a stream of Twitter® comments mentioning the operator, a series of images pertaining to the operator, a series of blog posts by or about the operator. Curated content may include forms for accepting requests for appointments with the operator, the forms designed to accept relevant information for the proposed appointment such as date, time, name, address, automobile and any associated username or user identification.

Curated content may also include predetermined or curated meta data. These meta data are typically portions of the template web page that are designed not to be rendered visibly for a user. Instead, the meta data may include information such as the business type, the services or products offered, any awards or certifications, business specialties and other similar information for use in search listings. The meta data are used by search engines and other web crawling services to categorize web pages and to identify whether a particular web page is relevant to a particular search.

The process of inputting meta data may enable an administrator 335 to input meta data manually or using checkboxes, radio buttons and/or drop-down menus, for inclusion in the resulting web page. Alternatively, the input of meta data may involve a guided process such that the system utilizes a series of predetermined current best-practices for meta data optimization. For example, the current best practices for meta data may indicate that including more than five data elements of a particular type in the meta data for a particular business will result in a lower incidence in search results provided by one or more web search companies. An administrator 335 may be guided to select fewer than five elements of that particular type in order to ensure the best possible search placement for the operator's website. An administrator 335 may choose to ignore the guided process, but may be warned about the potential consequences of doing so.

The system next accepts a selection of a template for the web page 430 to be associated with the operator. The template access may be via the operator system 330, but stored on the template host 340. The selected template may be used to generate one or more web pages for the operator. The access process may involve the selection from one of a plurality of available templates. The templates may be pre-screened based upon the entity type or business of the operator for which the web page is being created. For example, a subset of templates may be specifically suitable for businesses related to automotive repair. Alternatively, a user may be provided with a listing of all possible templates with suggested templates identified based upon the business of the operator.

A "template" as used herein is made up of, at least, style elements and a content container. The style elements include font selection, size and color; background color or images, graphical elements such as header images; header font selection, size and color; and other stylistic elements that are generally uniform for the entire web page. Content containers are elements of the template into which the entity data, entity-specified data and curated content (collectively "data elements") may be placed.

The style elements may include the overall layout, font selections, colors used on the site, and any default graphics related to the type of site. The style elements may be customized during web page generation or regeneration to create custom style elements. The custom style elements may include administrator-created graphics, alterations to the layout, font, colors and background of the resulting web page. Style elements also include the graphic design of each content container. In this way, each content container's appearance may be altered without changing the substantive content contained therein.

The content containers are implemented in such a way that they are designed to be replaced with the data elements. For example, one such content container may be a portion of a template intended to include an operator's name and/or address. Another such content container may be a portion of a template intended to include an operator's phone number or operating hours. Content containers may also include meta data, invisible to a viewer of the operator's web page or dynamically-generated content such as curated data including reviews pulled in real-time from third party providers and served along with the template-based operator's web page.

Style elements are distinct and separate from content containers. As such, both may be modified separately from the other. For example, an administrator may alter the style elements such that the font selection, size and color are changed. This will result in all fonts on the page, not otherwise customized, will take on those new style elements. Similarly, the content containers may be altered (or may include data elements obtained from unrelated third parties) but will still retain the same style elements of the operator's web page when integrated with the rest of the style elements and content containers.

The web page is then generated using the template 435. At web page generation (or as a web page is served in the case of content pulled from third party sites), the content containers are replaced, as directed by the template, with entity data, entity-specified data and curated data (the "data elements"). The meta data may also be included in the resulting web page. The template may include a plurality of content containers. As the web page is generated, the content containers are replaced with data elements obtained from the database 321. For example, a given template may include a series of moveable, resizable content containers. The left, middle of a template may include a content container including an [ADDRESS] field designed to include the operator's address, phone number, email address and operating hours.

When the web page is generated 435, the [ADDRESS] field in the content container may be replaced with the relevant entity data such that the resulting web page incorporates that data in place of the [ADDRESS] field. This may be implemented in a number of ways. First, the web page may be fully-generated at this stage replacing any content containers with the corresponding data elements. Second, the web page may be partially-generated such that content containers remain such that they operate as function calls, executed at the time that the web page is served by the web server 312, that obtain data elements relevant to those content containers and replace those content containers as the web page is being served to a requestor. The data elements to be used in the template may be copied from the database system 320 to website storage 311 for more rapid access as the web page is being served. Alternatively, the data elements may remain on the database 321 and be obtained as-needed by the website host 310. These data elements may include, for example, reviews, social networking comments, and similar data elements available from third parties that may be updated in real-time.

The template host 340 may enable custom revision to the web page 460. The user interface 341 of the template host 340 may enable the administrator 335 to interact with the template host 340 so as to revise portions of the web page, particularly style elements. These customizations may include altering fonts, colors, background images or including custom graphics on the resulting web page. These customizations may also include altering the placement, size and/or shape of content containers. Enabling custom revision to the web page 440 may also enable the administrator 335 to revise the template-based content containers or incorporated data elements.

The custom revision to the web page 440 may be enabled as a part of the web page generation process. After the web page is generated using the template 435, the administrator 335 may be able to further customize the web page. This customization process may require the administrator 335 to edit HTML documents or may be enabled through text boxes, file selection upload processes, checkboxes, radio buttons and similar wizard-style customization options. Using either process, the web page generated using the template 435 may be customized, particularly as to the style elements, as desired by an operator without disturbing the included data elements.

Next, the web page may be served 445. At this stage, the web page design is completed and it may be served, via the website host 310 to any requestors. The data elements for the web page appear to the requestor of the web page in place of the content containers with their appearance defined by the style elements.

Next, the template host 340 may receive a request to update the web page 450. This updated data may be updated data elements such as an address, telephone number, user review, social networking or online review site's description of the operator. Any of these data elements may have changed or been updated such that new data elements are necessary. Similarly, a search engine may have altered the way in which its indexing processes work such that the inclusion of a different set of meta data elements may be useful for enabling the operator to better reach its customers via web searches.

This request to update the web page 450 may be administrator 335 prompted or may be prompted in response to an automated update message to the administrator 335, may appear upon the login of the administrator 335 to the template host 310 or may be manually selected by an administrator 335. The request to update the web page 450 may be accepted or declined by the administrator 335. If it is declined, the process may end.

If the request to update the web page 450 is accepted, the web page may be regenerated 455 using any updated entity data or input meta data. The process then returns to obtain entity data 415. The entity data may have been updated by the database system 320 to incorporate new or altered entity data. The previously-obtained entity identifier may be used to obtain entity data 415 from the database 321. Similarly, updated entity-specified data may be received 420 along with any updated curated content 425. The template may be accessed again 430 in order to determine the data elements and meta data that will be updated. Any administrator selection or amendment to the data elements and meta data may be retained.

Next, the web page is then regenerated using the template and updated data elements 435. New meta data input may also be substituted for the meta data. Custom revision of the web page 440 is still available and the web page will still be served 445.

However, during the web page regeneration 455, any changes made to the style elements that differ from the default template are left unchanged. Only those data elements and meta data are replaced with updated data elements and new meta data. This may be accomplished by maintaining the data elements of the template-based website distinct from the style elements. For example, the data elements and meta data, may be maintained in the database 321 (or an associated template host 310 database) and the template may use an HTML-suitable scripting language to call for data elements from those databases. The style elements, may be stored as HTML incorporating the scripting language, for example as cascading style sheets presenting the data-based elements.

Subsequent requests to update the web page 450 and web page regeneration 455 may be enabled as well. The administrator 335 may interact with the template host 340 to update the web page as desired at any time after the web page's creation. The data elements, such as entity data, may be updated automatically by the system, the style elements may be initially generated by default, but enable the user to customize them, either using a web-based graphical user interface or manually as desired. The further updates alter the data elements while leaving the style elements unchanged.

The flow chart has both a start 405 and an end 495, but the process is cyclical in nature.

Figure 5:
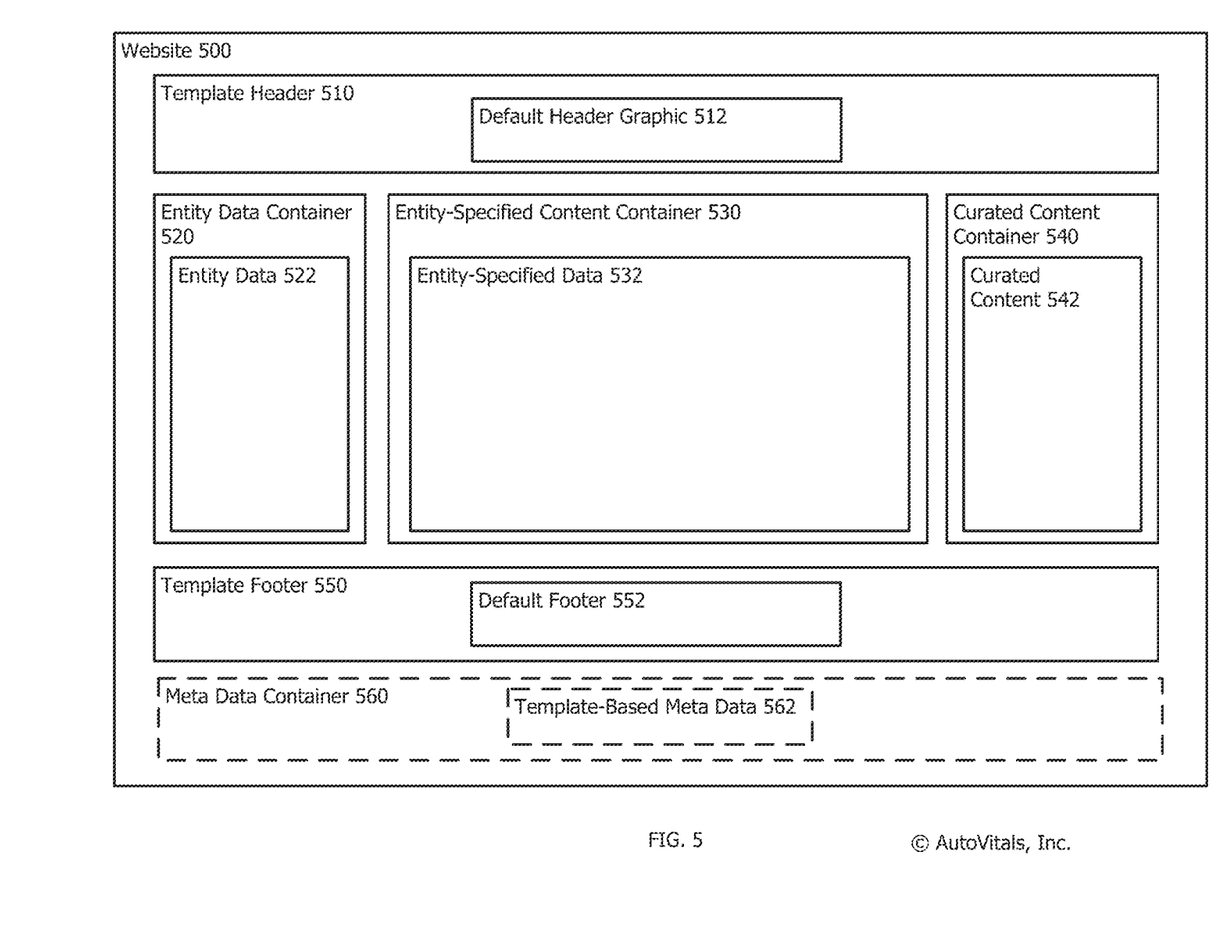
FIG. 5 is an abstraction of an example template based website.

FIG. 5 is an abstraction of an example template based website 500. This website 500 is of the type generated by the template host 340 in response to a request to do so by an administrator 335. The website 500 includes a template header 510 with a default header graphic 512. The template header 510 may use style elements including font type, color and size and may, for example, include the name of the operator. The default header graphic 512 may, for example, be a representative graphic of the entity-type of the operator. The default header graphic may be an image of an automobile, if the template selected for use in creating the website 500 was intended for use by automotive mechanics. A different default header graphic 512 may be used for each template or template type.

The entity data container 520 is a content container for the website 500 set aside to incorporate entity data 522. The entity data container 520 size, shape and location (among other things) may be style elements, while the entity data 522 to be presented therein are data elements, such as the operator name, phone number and address. The size, shape and location of the entity data container 520 may be altered by the administrator 335 without altering the entity data 522. As such the administrator can change any style element without effecting the presentation of the entity data 522.

The operator-specified content container 530 may be another data element. This operator-specified content container 530 may initially include default textual description relating to the operator's goods or services based upon the type of template selected. Once an administrator 335 generates entity-specified data 532, it may be included in place of the operator-specified content container 530. The size, shape and location of this operator-specified content container 530 may be a design element, subject to revision by an administrator 335. However, the operator-specified content container 530 is, replaced, at least in part, by entity-specified data. The inclusion of entity-specified data by the administrator 335 does not alter the appearance or location of the operator-specified content container 530, which are style elements.

The curated content container 540 is a content container, while its location, size and shape are style elements. The curated content container 540 may be replaced with curated content 542 including, for example, a series of customer reviews obtained from a database associated with the operator.

Template footer 550 is a content container that may include a default footer 552 styled according to the web pages style elements. Both the data elements and style elements may, initially, be default. Finally, the meta data container 560 may incorporate template-based meta data 562. The meta data container 560 and template-based meta data 562 are not rendered in a viewer's web browser, but are used by search engines to categorize and index the web page. The template-based meta data 562 are a data element that does not change with the web page is regenerated using the template.

Figure 6:
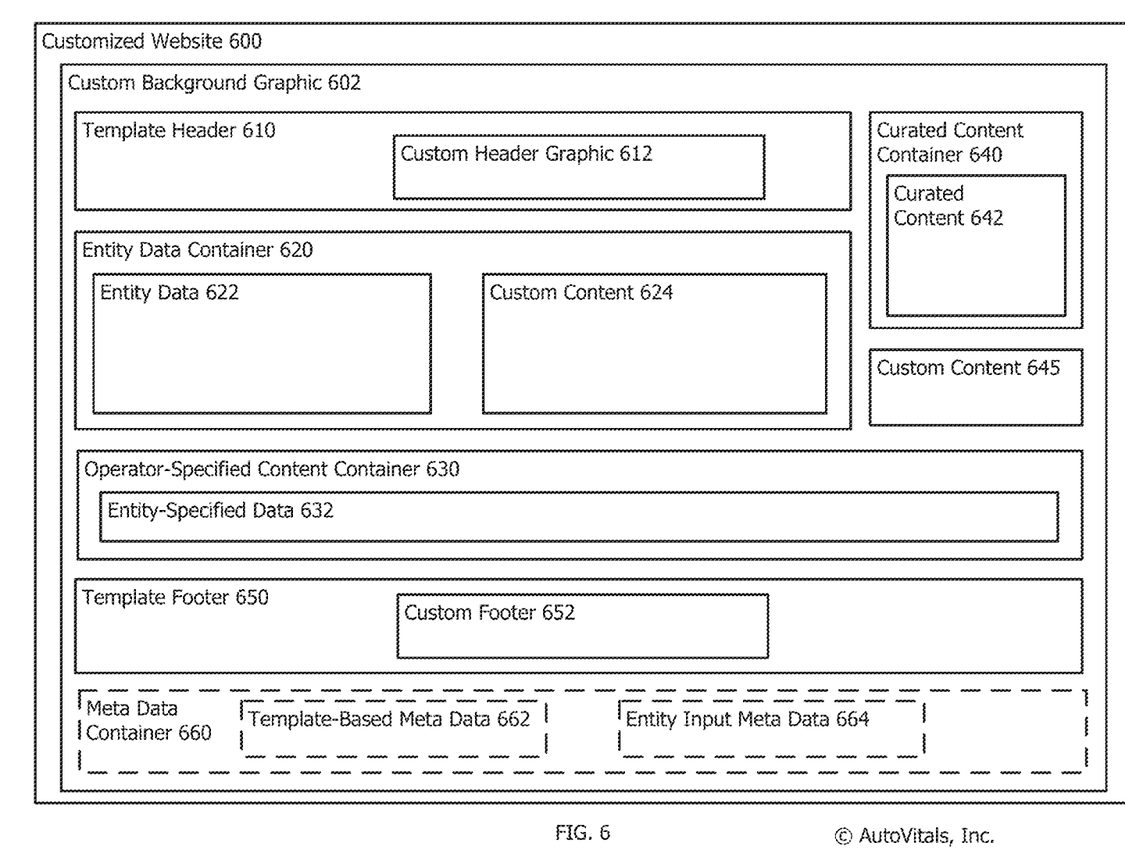
FIG. 6 is an abstraction of an example customized template based website.

FIG. 6 is an abstraction of an example customized template based website 600. This website 600 is a customized version of the website 500 (FIG. 5). The website 600 now includes a style element of a custom background graphic 602. This custom background graphic 602 was not a part of the template, but does not otherwise alter the content presented. The template header 610 includes a custom header graphic 612. This custom header graphic 612 may be, for example, a graphical header of a predetermined width and height that integrates well with the rest of the web page. The template header 610 style elements may have been changed such that text does not appear, but the graphical custom element 612 appears instead.

The entity data container 620 is now changed in size and shape. The size and shape of the entity data container 620 se are style elements. However, the entity data container 620 still includes entity data 622. This may present the same operator name, phone number and address. However, the entity data container 620 also includes custom content 624. This may be, for example, a link to a Facebook® page or Twitter® account associated with the operator. Operator-specified content container 630 is also still included along with the associated entity-specified data 632, but its style elements of size, shape and location have been customized.

Similarly, the curated content container 640 has been moved to a different size, shape and location. It still contains the same curated content also been added. The custom content may include endorsements, affiliations, reviews, text, graphics or other relevant content added by the administrator 335. The template footer 650, like the template header 610, includes a custom footer 652. This custom footer 652 may be one or more graphics, text or other elements.

Finally, the meta data container 660 still includes the template-based meta data 662. This template-based meta data 662 may be based upon user input so as to be more prominently featured in search results. However, additional or different operator input meta data 664 may also be included at the request or direction of the administrator 335.

Figure 7:
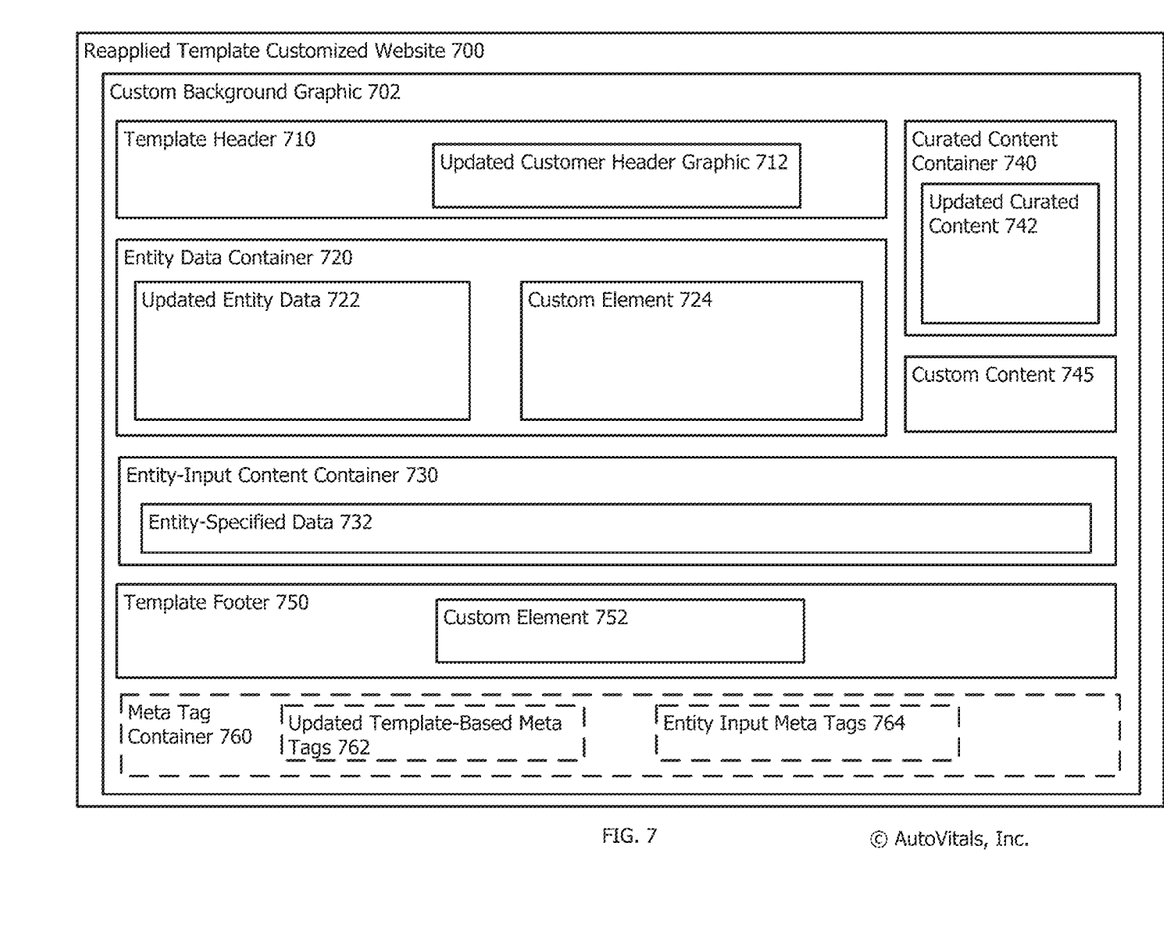
FIG. 7 is an abstraction of an example reapplication of the template to the customized template based website.

FIG. 7 is an abstraction of an example reapplication of the template to the customized template based website 700. This website 700 is the customized website 600 (FIG. 6) after the reapplication of the template to the data elements. The website 700 still includes the custom background graphic 702. The graphic 702 has not been replaced by the reapplication of the template because the graphic 702 is a style element. The template header 710 remains now including an updated custom header graphic 712. Similarly the style elements of size, shape and location of the template header 701 remain the same.

The entity data container 720 includes updated entity data 722. This data element 722 now includes updated entity data and is changed because it is a data element. The custom element 724 remains unchanged. The location, size, shape, fonts and other style elements associated with the entity data container 720 remain unchanged by the reapplication of the template.

The operator-specified content container 730 including the entity-specified data 732 remains, as does its customized size, shape and location. The curated content container 740 has been updated to include updated curated content 742. The size, shape and location of the updated imported entity data 740 remain the same. The custom content 745 also remains.

The template footer 750 remains, including the custom element 752. Finally, the meta data container 760 remains. The meta data container 760 may include updated template-based meta data 762, for example, incorporating new meta data elements or limitations on meta data recommended in order to maintain priority in search engine query results. The operator input meta data 764 may also remain.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for template based web site development and management comprising:
   obtaining input of an entity identifier uniquely associated with an entity operating a website, the entity identifier selected by one other than the entity and designating an entity database record within a database maintained by one other than the entity;
   obtaining entity data including data pertaining to the entity operating the website from the entity database record within the database using the entity identifier;
   accessing a template for a web page, the template including a content container and a style element;
   generating the web page for the entity using the template by dynamically inserting the entity data into the content container, the entity data inserted as the web page loads and rendered according to the style element for the web page;
   enabling revision of the web page by customizing the style element separately from the entity data to thereby create a customized style element;
   receiving a request to update the web page to include updated entity data from an updated entity database record within the database;
   obtaining the updated entity data including new data pertaining to the entity from the updated entity database record within the database using the entity identifier; and
   regenerating the web page using the template and the customized style element by dynamically inserting the updated entity data into the content container as the web page loads and, the web page rendered so as to include the updated entity data rendered according to the customized style element.

2. The method of claim 1 wherein the entity identifier is a custom identification number set by a database entity and further wherein the entity data is accessible using the custom identification number via an application programming interface.

3. The method of claim 2 wherein the entity data is provided by the application programming interface in a form suitable for inclusion in the web page.

4. The method of claim 1 wherein the customized style element created by the entity alters the appearance of the entity data visible on the web page.

5. The method of claim 1 wherein the template further includes a second content container, the method further comprising:
   enabling user input of a meta data;
   incorporating the meta data into the web page by inserting the meta data into the second content container;
   accepting an updated meta data for inclusion in the web page; and
   wherein regenerating the web page using the template further includes inserting the updated meta data into the second content container, the second content container presented as directed by the customized style element.

6. The method of claim 5 wherein the meta data is optimized for prioritized indexing by search engines.

7. The method of claim 5 wherein the content container is modifiable such that attributes defining size, shape and arrangement of the content container may be changed while leaving the entity data unchanged.

8. The method of claim 1 wherein the customized style element includes graphics.

9. The method of claim 1 further comprising regenerating the web page and a plurality of other web pages based upon the template so as to incorporate at least one of: (1) new entity data, (2) a new content container, (3) new meta data, (4) a new graphical element and (5) a new style element.

10. Apparatus comprising a storage medium storing a program having instructions which when executed by a processor will cause the processor to:
    obtain input of an entity identifier uniquely associated with an entity operating a website, the entity identifier selected by one other than the entity and designating an entity database record within a database maintained by one other than the entity;
    obtain entity data including data pertaining to the entity operating the web site from the entity database record within the database using the entity identifier;
    access a template for a web page, the template including a content container and a style element;

generate the web page for the entity using the template by dynamically inserting the entity data into the content container, the entity data inserted as the web page loads and presented as directed by the style element;

enable revision of the web page by customizing the style element separately from the entity data to thereby create a customized style element;

receive a request to update the web page to include updated entity data from an updated entity database record within the database;

obtain the updated entity data including new data pertaining to the entity from the updated entity database record within the database using the entity identifier; and regenerate the web page using the template and the customized style element by dynamically inserting the updated entity data into the content container as the web page loads and, the web page rendered so as to include the updated entity data presented as directed by the customized style element.

11. The apparatus of claim 10 wherein the entity identifier is a custom identification number set by a database operator and further wherein the entity data is accessible using the custom identification number via an application programming interface.

12. The apparatus of claim 11 wherein the entity data is provided by the application programming interface in a form suitable for inclusion in the web page.

13. The apparatus of claim 10 wherein the customized style element created by the entity alters the appearance of the entity data visible on the web page.

14. The apparatus of claim 10 wherein the template further includes a second content container, the instructions further cause the processor to:

enable user input of meta data; incorporate the meta data into the web page by inserting the metadata into the second content container;

accept updated meta data for inclusion in the web page; and insert the updated meta data into the second content container, the second content container presented as directed by the customized style element.

15. The apparatus of claim 14 wherein the meta data is optimized for prioritized indexing by search engines.

16. The apparatus of claim 14 wherein the content container is modifiable such that attributes defining size, shape and arrangement of the content container may be changed while leaving the entity data unchanged.

17. The apparatus of claim 10 wherein the customized style element includes graphics.

18. The apparatus of claim 10 further comprising:
the processor;
a memory;
wherein the processor and the memory comprise circuits and software for performing the instructions on the storage medium.

19. The apparatus of claim 10 wherein the instructions further cause the processor to regenerate the web page and a plurality of other web pages based upon the template so as to incorporate at least one of: (1) new entity data, (2) a new content container, (3) new meta data, (4) a new graphical element and (5) a new style element.

* * * * *